UNITED STATES PATENT OFFICE.

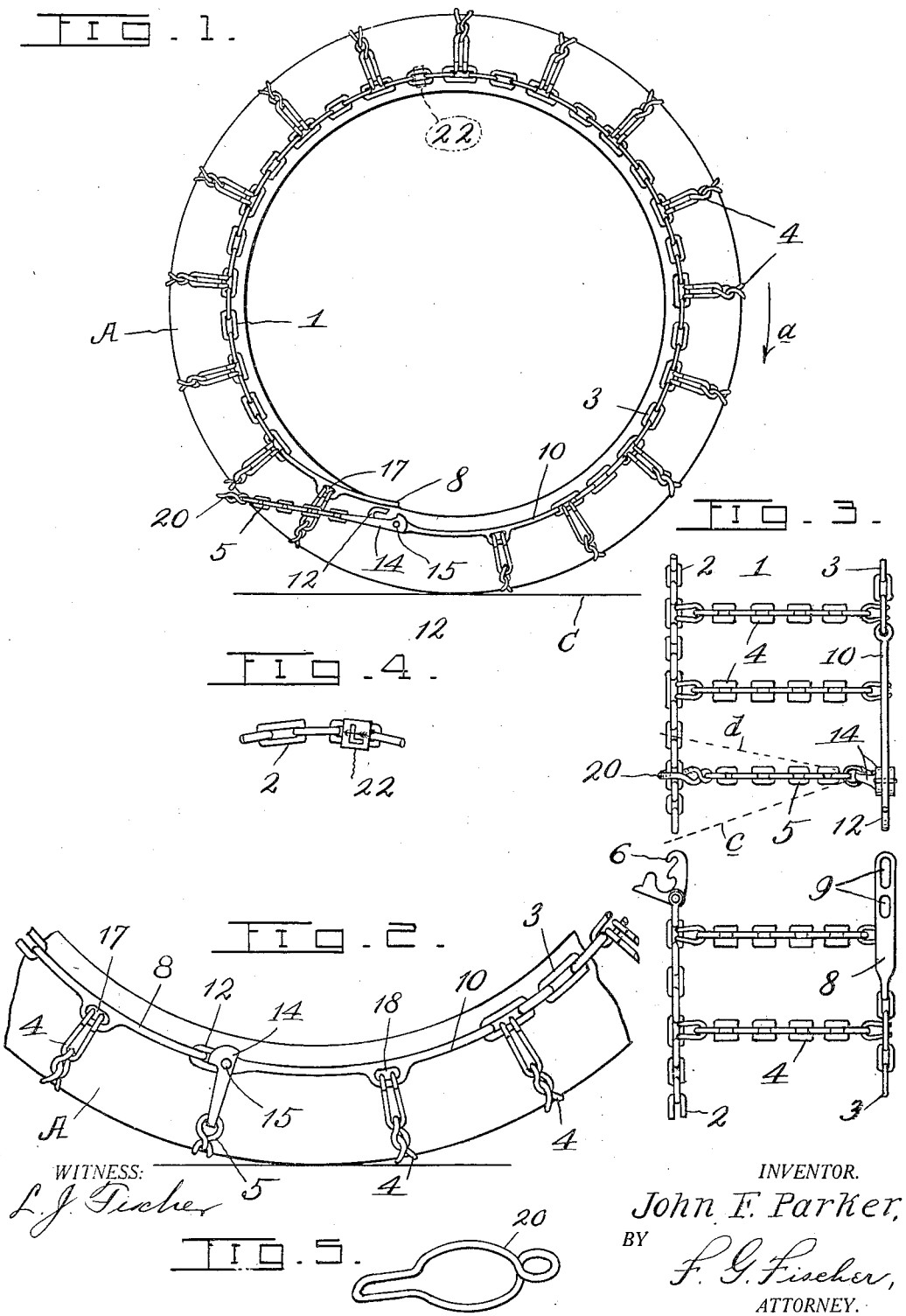

JOHN F. PARKER, OF KANSAS CITY, MISSOURI.

NON-SKID CHAIN.

1,340,183.  Specification of Letters Patent.  Patented May 18, 1920.

Application filed April 28, 1919. Serial No. 293,213.

*To all whom it may concern:*

Be it known that I, JOHN F. PARKER, a citizen of the United States, residing at Kansas City, in the county of Jackson and State of Missouri, have invented certain new and useful Improvements in Non-Skid Chains, of which the following is a specification.

My invention relates to antiskid chains for automobile tires and is an improvement over the device disclosed by my co-pending application filed July 23, 1917, Serial No. 182,193.

One object of the present invention is to provide a chain of this character which may be quickly applied to an automobile tire without raising the same from the ground or moving the automobile.

Another object is to provide a chain having an improved fastening device, by means of which it may be quickly and adjustably secured in place, and which is reliably held from becoming accidentally unfastened while in position upon the tire.

Another object is to provide each chain with an indicator to show which portion of the tire the central part of the chain should be applied to in order to allow the ends to fall in correct position to be fastened at the lower portion of the tire. Said indicator also determines which chain is to be applied to the left tire and which is to be applied to the right tire.

In order that the invention may be fully understood, reference will now be made to the accompanying drawing, in which:

Figure 1 is a side elevation of a tire with the chain applied thereto and the ends of said chain in position to be connected together.

Fig. 2 is a fragmentary, side elevation of the tire and the chain with its ends connected.

Fig. 3 is a plan view of a portion of the chain, showing the fastening devices disconnected.

Fig. 4 is a fragmentary view of the chain with the indicator thereon.

Fig. 5 is a detail of the sliding link.

In carrying out the invention, a chain 1 is employed which is shown in position upon the tire A. Said chain consists of two parallel longitudinal strands 2 and 3 connected at intervals by short, cross strands 4 and 5.
One end of the longitudinal strand 2 has a hook 6 of well-known form for engagement with the opposite end of said strand 2.

The strand 3 is provided at one end with a long stiff link member 8 having a plurality of eyes 9, so that the chain 1 may be adjustably secured in correct position upon the tire A. The opposite end of the strand 3 has a long stiff member 10, provided at its free end with a hook 12 adapted to pass through any of the eyes 9 in the link member 8, and thus detachably and adjustably secure the two stiff members 8 and 10 together.

14 designates a keeper connected by a pivot 15 to the stiff member 10 and having one end connected to the cross strand 5. Said keeper 14 is adapted to close the open end of the hook 12 as disclosed on Fig. 2, and thus prevent said hook 12 from becoming disengaged from the link member 8.

The stiff members 8 and 10 have loops 17 and 18, respectively, intermediate their ends, to receive the adjacent ends of two of the cross strands 4.

20 designates a link connected to one end of the cross strand 5, and slidably and detachably connected to the strand 2, as indicated by dotted lines $c$ and $d$, Fig. 3.

22 designates an indicator consisting of a plate secured to one of the links of the strand 2, Fig. 4. Said indicator 22 is, preferably, placed about midway between the ends of the strand 2, so that when placed over the tire A at approximately its upper vertical axis, the ends of the chain 1 will fall in proper position to be secured together at the lower portion of the tire A. The indicator 22 also bears a letter as L or R, and an arrow to indicate on which side of the automobile the chain 1 is to be placed and in a direction to correspond with the direction of travel of the tire.

In practice, when it is desired to apply the chain to a certain tire, the operator first finds the indicator 22. Should said indicator 22 bear the letter L as shown on the drawing it indicates that the chain is to be placed on a tire on the left side of the automobile, with the arrow on the indicator pointing in the direction the tire is to travel, indicated by the arrow $a$, Fig. 1. Said chain 1 is then placed over the tire with the indicator at a point about midway of the vertical axis of said tire, thus allowing the loose ends of the chain to fall toward the lower portion of the tire with the strand 3 next to the body of the automobile. The operator then takes his position in front of the tire A and pushes the stiff member 10 backwardly as far as he can reach. He then steps to the rear of the tire A, grasps the free end of the short strand 5 with one hand and pulls said strand 5 toward him. This operation opens the keeper 14 and allows the link member 8 to be engaged over the hook 12 with the other hand. The strand 5 is then drawn beneath the tire A at right angles to the stiff member 10, causing the keeper 14 to close the hook 12 as shown on Fig. 2, and the link 20 is slipped into position over the free end of the longitudinal strand 2, the ends of which are then connected by the hook 6.

While I have shown the preferred embodiment of the present invention, I reserve the right to make such changes in the construction, combination and arrangement of parts, as properly fall within the spirit and scope of the claims.

Having thus described my invention, what I claim and desire to secure by Letters Patent, is:

1. In a chain of the character described, two longitudinal strands, short transverse strands spaced apart and connected to said longitudinal strands, means for detachably connecting the ends of one of said longitudinal strands, a stiff member connected to one end of the other longitudinal strand, and a stiff member connected to the opposite end of said other longitudinal strand and adapt to detachably engage the first stiff member, and means for holding one of the stiff members in position to be engaged by the companion stiff member.

2. In a chain of the character described, two longitudinal strands, short transverse strands spaced apart and connected to said longitudinal strands, means for detachably connecting the ends of one of said longitudinal strands, a stiff member connected to one end of the other longitudinal strand, a stiff member connected to the opposite end of said other longitudinal strand and adapted to detachably engage the first stiff member, means on one of said stiff members to prevent the same from becoming disengaged from the companion stiff member, and a transverse strand connected to one of the longitudinal strands and the last-mentioned means to retain the same in active position.

3. In combination with a nonskid chain embodying two longitudinal strands, short transverse strands connected to said longitudinal strands and means for connecting the ends of one of said longitudinal strands; a long stiff member connected to one end of the other longitudinal strand and provided at its free end with a hook, a long stiff member at the opposite end of said other longitudinal strand and provided with a plurality of eyes for engagement over the hook on the companion stiff member, and a keeper operably-mounted on the first stiff member to close the hook thereon and prevent it from becoming disengaged from the companion stiff member.

4. In combination with a nonskid chain embodying two longitudinal strands, short transverse strands connected to said longitudinal strands and means for connecting the ends of one of said longitudinal strands; a long stiff member connected to one end of the other longitudinal strand and provided at its free end with a hook, a long stiff member at the opposite end of said other longitudinal strand and provided with an eye for engagement over the hook on the companion stiff member, a keeper operably-mounted on the first stiff member to close the hook thereon and prevent it from becoming disengaged from the companion stiff member, and a transverse strand connected to one of the longitudinal strands and said keeper to retain the same in active position.

5. In combination with a nonskid chain embodying two longitudinal strands, short transverse strands connected to said longitudinal strands and means for connecting the ends of one of said longitudinal strands: a long stiff member connected to one end of the other longitudinal strand and provided at its free end with a hook, a long stiff member at the opposite end of said other longitudinal strand and provided with an eye for engagement over the hook on the companion stiff member, a keeper operably-mounted on the first stiff member to close the hook thereon and prevent it from becoming disengaged from the companion stiff member, a short transverse strand connected to said keeper to retain the same in active position, and a link on the free end of the last-mentioned transverse strand which slidably and detachably engages one of the longitudinal strands.

6. In combination with a nonskid chain embodying two longitudinal strands, short transverse strands connected to said longitudinal strands and means for connecting the ends of one of said longitudinal strands; a long stiff member connected to one end of the other longitudinal strand and provided at its free end with a hook adapted to engage the opposite end of the last-mentioned strand, a keeper operably mounted upon said stiff member and adapted to close the hook thereon, a short transverse strand connected to said keeper to retain the same in active position, and means on the free end of the last-mentioned strand to adjustably engage the opposite longitudinal strand.

7. In combination with a nonskid chain embodying two longitudinal strands, short transverse strands connected to said longitudinal strands and means for connecting the ends of one of said longitudinal strands; a long stiff member connected to one end of the other longitudinal strand and provided at its free end with a hook adapted to engage the opposite end of the last-mentioned strand, a keeper operably mounted upon said stiff member and adapted to close the hook thereon, and a transverse strand detachably connected to one of the longitudinal strands and said keeper to retain the same in active position.

8. The combination in a nonskid tire chain embodying two longitudinal strands of unequal length, short transverse strands spaced apart and connected to said longitudinal strands, means for detachably connecting the ends of the longer longitudinal strand, a long stiff member attached to one end of the short longitudinal strand, another long stiff member attached to the opposite end of the said short longitudinal strand, means for adjustably and detachably connecting the free ends of the said two stiff members, and short transverse strands connected to the said stiff members and the longer longitudinal strand.

9. In a chain of the character described, two longitudinal strands of unequal length, short transverse strands spaced apart and attached to the said longitudinal strands, means for detachably connecting the ends of the longer longitudinal strand, long stiff members attached to the ends of the short longitudinal strand, means for detachably connecting the free ends of the said stiff members, and a short transverse strand with one end attached to one of the said long stiff members and the free end adapted to detachably engage the longer longitudinal strand.

10. The combination in a nonskid tire chain comprising a longitudinal strand with means for detachably connecting its ends, another shorter longitudinal strand, long stiff members attached to the ends of said shorter strand, the combined length approximately equal to the first mentioned strand, means for detachably connecting the free ends of the said stiff members, short transverse strands spaced apart and attached to the two longitudinal strands, short transverse strands attached to the stiff members and the opposite longitudinal strand, a short transverse strand connected at one end to one of the stiff members, and means on the other end of the last-mentioned short strand to detachably connect with the longer longitudinal strand.

In testimony whereof I affix my signature, in the presence of two witnesses.

JOHN F. PARKER.

Witnesses:
F. G. FISCHER,
L. J. FISCHER.